United States Patent [19]
Kachmarik et al.

[11] Patent Number: 5,703,440
[45] Date of Patent: Dec. 30, 1997

[54] COMPACT FLUORESCENT LAMP AND BALLAST ARRANGEMENT WITH INDUCTOR DIRECTLY BETWEEN LAMP ENDS

[75] Inventors: David J. Kachmarik, Strongsville; Thomas F. Soules, Richmond Heights, both of Ohio; Raymond A. Fillion, Niskayuna, N.Y.; Erwin G. Steinbrenner, Parma Heights, Ohio; Donald W. Kuk, Albany, N.Y.

[73] Assignee: General Electric Company, Schenectady, N.Y.

[21] Appl. No.: 647,605

[22] Filed: May 13, 1996

[51] Int. Cl.$^6$ .................................................. H05B 37/02
[52] U.S. Cl. ........................................ 315/56; 315/71
[58] Field of Search ........................... 315/56, 58, 70, 315/71

[56] References Cited

U.S. PATENT DOCUMENTS

| | | | |
|---|---|---|---|
| 2,788,462 | 4/1957 | MacFarlane | 313/634 |
| 3,764,844 | 10/1973 | Schmidt | 313/220 |
| 3,886,396 | 5/1975 | Hammer et al. | 313/486 |
| 3,898,495 | 8/1975 | Livera | 313/51 |
| 3,953,761 | 4/1976 | Giudice | 315/71 |
| 4,311,943 | 1/1982 | Gross et al. | 315/57 |
| 4,503,360 | 3/1985 | Bedel | 315/112 |
| 4,694,215 | 9/1987 | Hofmann | 315/44 |
| 4,797,594 | 1/1989 | Sigai et al. | 315/488 |
| 4,857,806 | 8/1989 | Nilssen | 315/56 |
| 4,871,944 | 10/1989 | Skwirut et al. | 315/56 |
| 4,961,027 | 10/1990 | Muessli | 315/58 |
| 5,128,590 | 7/1992 | Holzer | 315/58 |
| 5,150,965 | 9/1992 | Fox | 362/260 |
| 5,220,236 | 6/1993 | Washburn et al. | 313/26 |
| 5,331,168 | 7/1994 | Beaubien et al. | 250/372 |
| 5,341,068 | 8/1994 | Nerone | 315/219 |
| 5,361,017 | 11/1994 | Krause | 315/151 |
| 5,506,474 | 4/1996 | Hammer et al. | 315/56 |
| 5,545,950 | 8/1996 | Cho | 315/56 |

FOREIGN PATENT DOCUMENTS

4133077 A1  4/1993  Germany.

*Primary Examiner*—Robert Pascal
*Assistant Examiner*—Michael Shingleton
*Attorney, Agent, or Firm*—George E. Hawranko

[57] ABSTRACT

Disclosed is a fluorescent lamp and ballast arrangement of the type having a lamp base for connection to a fixture that also accommodates a lamp base of an incandescent lamp. A ballast circuit contains a first conversion circuit which converts a.c. voltage to d.c. voltage and which has an electrolytic capacitor for smoothing the d.c. voltage. The ballast circuit further includes a second conversion circuit which converts the d.c. voltage into a.c. current and which includes a resonant inductor and resonant capacitor. A ballast housing has first and second ends spaced along a longitudinal axis of the housing and encloses parts of the ballast circuit. Only two lamp tube portions of the lamp terminate in the first end of the ballast housing, with the resonant inductor being positioned between the two lamp tube portions. Preferably, a pair of printed-circuit boards are positioned within the ballast housing, between the electrolytic capacitor and the resonant inductor, and are dimensioned to convectively shield the capacitor from the inductor and the lamp tube portions. Substantially all ballast components in addition to the resonant inductor and the electrolytic capacitor are preferably sandwiched between the pair of printed-circuit boards. Additionally, the electrolytic capacitor is preferably positioned at least partially within the lamp base. Employing all the foregoing features together has resulted in ballast component temperatures that are equal to, or lower, than ballast component temperatures on comparable high wattage (i.e., greater than about 20 watts) but much larger ballasts that are integral (as here) to the lamp.

18 Claims, 2 Drawing Sheets

COMPACT FLUORESCENT LAMP AND BALLAST ARRANGEMENT WITH INDUCTOR DIRECTLY BETWEEN LAMP ENDS

FIELD OF THE INVENTION

The present invention relates to fluorescent lamp and ballast arrangements, and more particularly to such lamp and ballast arrangements that are characterized by compactness on the one hand, and a minimizing of ballast component operating temperature for long lamp life on the other hand.

BACKGROUND OF THE INVENTION

High frequency (e.g., 30–100 kHz) electronic ballasts that are integral to compact fluorescent lamps typically utilize two stages of power conversion. A first conversion circuit receives the incoming, e.g., 50–60 Hz a.c. line voltage and rectifies such voltage to a d.c. voltage. This is typically accomplished with a rectifying circuit containing a diode bridge, filters and typically one or two electrolytic capacitors to smooth the resulting waveform. The rectified, or d.c., current then supplies a second converter circuit, which typically is a Class D self-oscillating invertor circuit containing a resonant inductor, a resonant capacitor, and the lamp. The lamp behaves like a resistor with an impedance that decreases with increasing current. The second conversion circuit typically includes auxiliary circuits, such as a circuit to produce a high voltage spike for starting the lamp discharge on each cycle, and, in some cases, a preheat circuit for heating the lamp electrodes prior to starting.

A key problem in designing a ballast circuit for a compact fluorescent lamp is how to configure the mentioned two converter circuits so that the lamp and the ballast will fit into the space usually allowed for incandescent lamps. This problem is complicated by the fact that the terminations, or ends, of lamp tubes must extend into a ballast housing in order to be fixed to the ballast and base. These terminations, especially the two containing the lamp electrodes, transfer a large amount of heat into the ballast housing. The resulting high temperatures can prematurely damage or destroy various heat-intolerant electronic components. Further exacerbating the problem is the fact that ballast components themselves also generate heat when operated at the high currents typically used in compact fluorescent lamps. The combined heating effects from the lamp and ballast mitigate against having a small compact ballast fitting closely to the bottom of the lamp.

OBJECTS AND SUMMARY OF THE INVENTION

Accordingly, it is an object of the invention to provide a fluorescent lamp and ballast arrangement that maintains compactness and a desirably low temperature ballast operation.

A more specific object of the invention is to provide a fluorescent lamp and ballast arrangement of the foregoing type that incorporates a lamp base which fits into a fixture also accommodating an incandescent lamp.

In accordance with a preferred form of the invention, there is provided a fluorescent lamp and ballast arrangement of the type having a lamp base for connection to a fixture that also accommodates a lamp base of an incandescent lamp. A ballast circuit contains a first conversion circuit which converts a.c. voltage to d.c. voltage and which has an electrolytic capacitor for smoothing the d.c. voltage. The ballast circuit further includes a second conversion circuit which converts the d.c. voltage into a.c. current and which includes a resonant inductor and resonant capacitor. A ballast housing has first and second ends spaced along a longitudinal axis of the housing and encloses parts of the ballast circuit. Only two lamp tube portions of the lamp terminate in the first end of the ballast housing, with the resonant inductor being positioned between the two lamp tube portions. Preferably, a pair of printed-circuit boards are positioned within the ballast housing, between the electrolytic capacitor and the resonant inductor, and are dimensioned to convectively shield the capacitor from the inductor and the lamp tube portions. Substantially all ballast components in addition to the resonant inductor and the electrolytic capacitor are preferably sandwiched between the pair of printed-circuit boards. Additionally, the electrolytic capacitor is preferably positioned at least partially within the lamp base. Employing all the foregoing features together has resulted in ballast component temperatures that are equal to, or lower, than ballast component temperatures on comparable high wattage (i. e., greater than about 20 watts) but much larger ballasts that are integral (as here) to the lamp.

BRIEF DESCRIPTION OF THE DRAWINGS

The foregoing objects and further advantages and features of the invention will become apparent from the following description taken in conjunction with the drawing, in which like reference numerals refer to like parts, in which the drawings are approximately to scale, and in which.

DETAILED DESCRIPTION OF THE PREFERRED EMBODIMENTS

Figure 1:
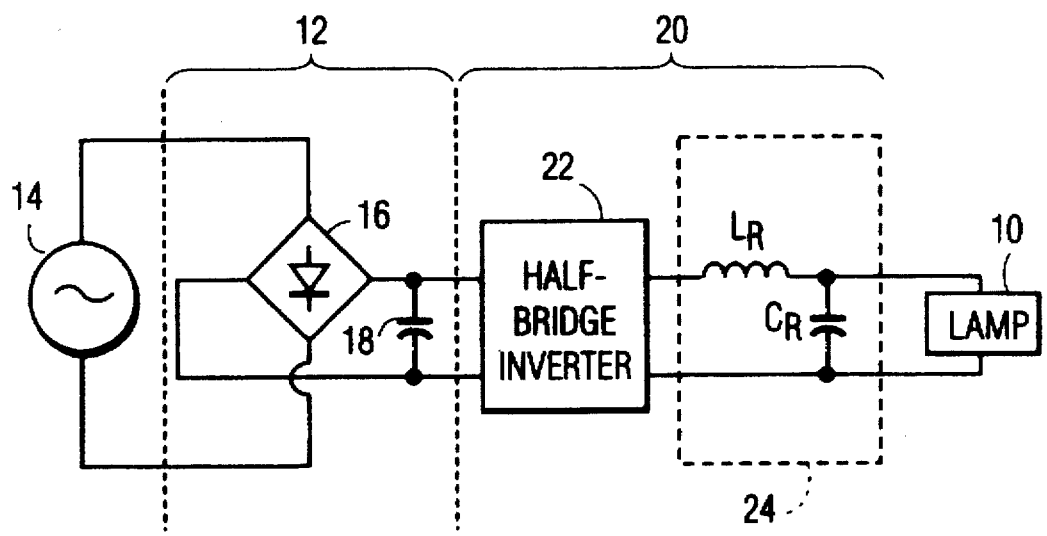
FIG. 1 is a schematic diagram, partly in block form, of a ballast circuit for a fluorescent lamp.

FIG. 1 shows a ballast circuit for a lamp 10, such as a compact fluorescent lamp. The ballast circuit includes a first converter 12 that receives a.c. voltage from an a.c. source 14 and converts it to a d.c. voltage. To accomplish this, converter 12 typically includes a full-wave bridge rectifier 16 of the p-n diode type, for instance. One or more electrolytic capacitors 18 are used to smooth the d.c. voltage produced by rectifier 16. A second converter 20 then converts the d.c. voltage it receives into a high frequency a.c. current used to supply lamp 10. Converter circuit 20 includes an oscillator 22-driven half bridge and a matching means 24, which typically comprises a serially connected resonant inductor $L_R$ and resonant capacitor $C_R$, with the lamp 10 shunted across the resonant capacitor $C_R$.

Figure 2:
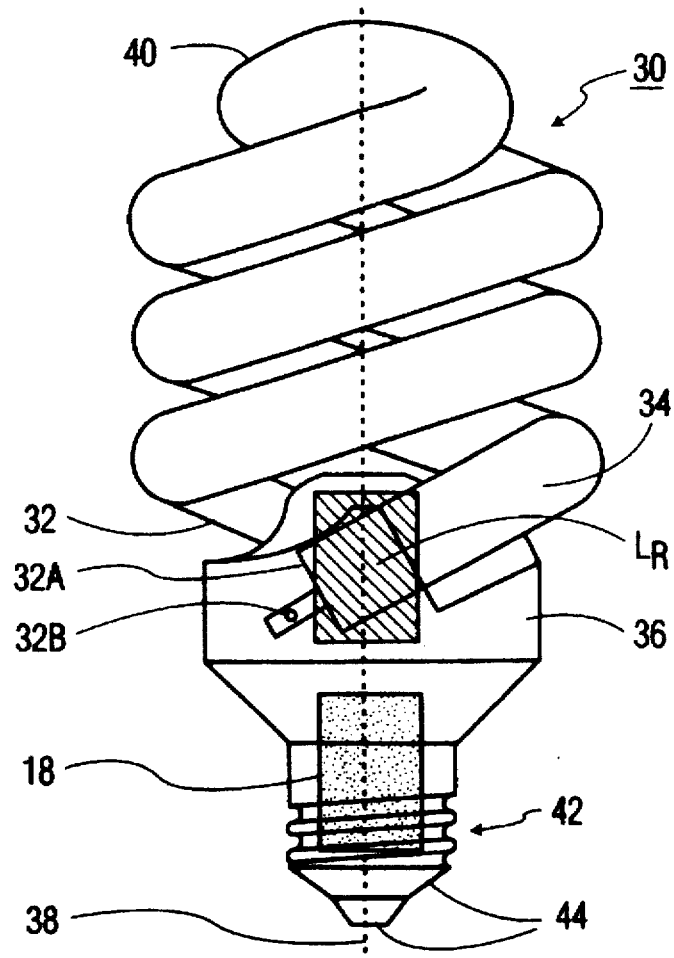
FIG. 2 is a simplified, side plan view of a compact fluorescent lamp in accordance with the invention.

FIG. 2 shows a lamp and ballast arrangement 30 incorporating features of the present invention. Arrangement 30 includes lamp tube portions 32 and 34 which have respective terminations that are made into the upper-shown end of a ballast housing 36. Termination 32A is shown for lamp tube portion 32; a corresponding termination for lamp tube portion 34 (not shown) exists at the back of the lamp as shown, and preferably has the same general shape as termination 32A. The terminations of lamp tube portions 32 and 34 are preferably made at an angle to a longitudinal axis 38 of ballast housing 36. Such "angled" terminations and the continuation of lamp tube portions 32 and 34 upwardly in respective helical configurations results in a particularly compact configuration for lamp 30 in the vertical direction. Beneficially, this can allow lamp 30 to fit within lamp fixtures originally designed for a standard incandescent lamp.

The respective upper regions of lamp tube portions 32 and 34 are joined by tube portion 40. By having only two lamp tube portions 32 and 34 terminate into ballast housing 36, rather than up to six or eight according to the prior art, the temperature of the adjacent ballast housing is considerably reduced, e.g., typically by 30°–35° C., which appreciably adds to the life of the nearby ballast components (not shown).

Ballast housing 36 is shown as transparent so as to conveniently illustrate the placement of resonant inductor $L_R$ within such housing; in practice, housing 36 would be opaque. Resonant inductor $L_R$ is shown with diagonal hatching for convenience. Resonant inductor $L_R$ is preferably aligned with longitudinal axis 38 of the ballast housing, and positioned between the terminations of lamp tube portions 32 and 34 (e.g. 32A and its un-shown counterpart for tube portion 34). This is because resonant inductor $L_R$, typically comprising wire wound on a ferrite core, is relatively temperature tolerant compared with other ballast components, and can withstand the typical temperatures of 110°–140° C. existing near the lamp tube terminations. On the other hand, resonant inductor $L_R$ itself is a significant heat generator, and beneficially serves to heat the lower ends of the lamp tube terminations (e.g. 32A), e.g., exhaust tube 32B, which may hold a mercury-containing amalgam. This hastens warm-up of the lamp, and provides better control of the temperature of the amalgam, resulting in better mercury vapor pressure control.

As shown in FIG. 2, lamp base 42 is provided beneath ballast housing 36, and may have, as is conventional, a pair of terminals 44 for connection to a power supply (not shown). Lamp base 42 may comprise a standard Edison-type screw base of the type used for conventional incandescent lamps. Lamp base 42 is shown as transparent so as to conveniently show the placement of electrolytic capacitor 18 at least partially within the lamp base; in practice, the lamp base is opaque. Electrolytic capacitor 18, whose function has been described in connection with FIG. 1, is shown for convenience as stippled. Electrolytic capacitor 18, being one of the more heat-intolerant components of ballast circuitry, is beneficially spaced by a considerable distance from the heat of the lamp tube terminations (e.g., 32A) as well as from the heat of resonant inductor $L_R$, while still allowing for a vertically compact lamp.

Because both resonant inductor $L_R$ and electrolytic capacitor 18 are relatively large compared to the other ballast components, their respective placements between the terminations of lamp tube portions 32 and 34, and within lamp base 42, significantly contribute to the vertical compactness of the lamp.

Preferably, the volume of the lamp above resonant inductor $L_R$ and its covering portion of ballast housing 36, i.e., between the helical turns of lamp tube portions 32 and 34, remains empty. The reason is that anything within such volume, which serves as a light-generating region of the lamp, will result in absorption of light so as to decrease lamp efficiency.

Figure 3:
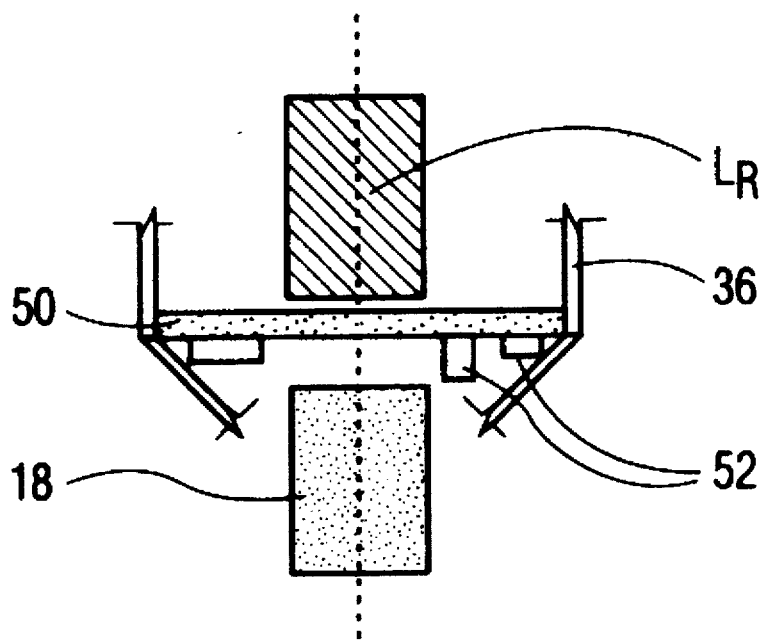
FIG. 3 is a simplified side, detail view showing convective isolation of an electrolytic capacitor from a resonant inductor by a printed-circuit board.

In addition to the mentioned spacing between electrolytic capacitor 18 and resonant inductor $L_R$, for example, additional thermal isolation of the capacitor is obtained by placement of a convective barrier between these components. One such convective barrier is shown in FIG. 3 as a printed-circuit board 50 that isolates capacitor 18 from resonant inductor $L_R$. Printed-circuit board 50 is positioned within ballast housing 36, and is dimensioned to compartmentalize the housing into upper and lower portions; in this way, board 50 convectively shields capacitor 18 from resonant inductor $L_R$. Preferably, the surface-mounted components 52 of the printed-circuit board 50 face downwardly as shown, i.e., away from the lamp tube terminations (e.g. 32A) and resonant inductor $L_R$; this minimizes heating of such components. The electrical connections from the resonant inductor $L_R$ and electrolytic capacitor 18 are omitted from FIG. 3 for convenience.

Figure 4:
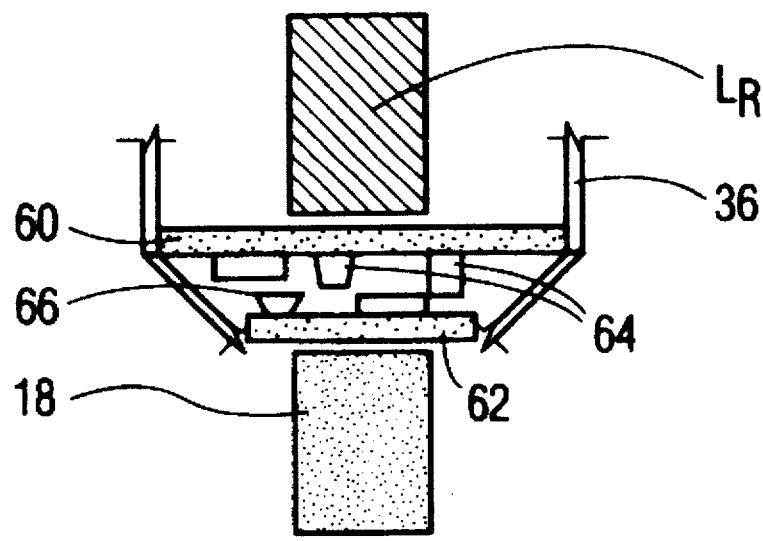
FIG. 4 is similar to FIG. 3 but shows the use of a pair of printed-circuit boards to achieve convective isolation of an electrolytic capacitor from a resonant inductor.

An even more robust convective barrier between electrolytic capacitor 18 and resonant inductor $L_R$ is provided by the arrangement of FIG. 4, which uses a pair of printed-circuit boards 60 and 62. As with printed-circuit board 50 in FIG. 3, such printed-circuit boards 60 and 62 are dimensioned to compartmentalize ballast housing 36 into upper and lower regions; in this way, boards 60 and 62 convectively shield electrolytic capacitor 18 from resonant inductor $L_R$. Surface-mounted ballast components 64 and 66 on boards 60 and 62, respectively, are preferably sandwiched between the two boards as shown, with the boards being closely spaced to achieve lamp compactness. Preferably, surface-mounted components 66 on the lower-shown board 62, nearest to the incoming line current, include the rectifying bridge (16, FIG. 1) and any filters; and surface-mounted components 64 on the upper-shown board 60 include the oscillator (22, FIG. 1) and other auxiliary circuits. Wires for inter-connecting the boards 60 and 62 and for connecting electrolytic capacitor 18 and resonant inductor $L_R$ to the boards are not shown in FIG. 4 for convenience.

The various surface-mounted components described above in connection with the mentioned printed-circuit boards (e.g., 50, FIG. 3 and 64 & 66, FIG. 4) preferably include an integrated circuit for combining the electrical functions of several discrete components.

The foregoing describes various features for minimizing the temperature of especially temperature-intolerant ballast components, while maintaining a compact lamp design. These features include having only two lamp tubes portions 32 and 34 terminate in the ballast housing; placing the resonant inductor $L_R$ between the lamp tube ends (e.g., 32A); preferably using the sandwiched construction of printed-circuit boards 60 and 62 so as to convectively shield the more temperature-intolerant ballast components from the main heat-generating elements, i.e., the lamp and the resonant inductor $L_R$; and placing electrolytic capacitor 18 at least partially in the lamp base 42. Employing all these features together has resulted in ballast component temperatures that are equal to, or lower, than ballast component temperatures on comparable high wattage (i.e., greater than about 20 watts) but much larger ballasts that are integral (as here) to the lamp. In particular, typical lamp designs make it possible to keep the heat intolerant electrolytic capacitor below about 80° C. More importantly, at these high wattages, all ballast components can operate at or below their rated temperature.

While the invention has been described with respect to specific embodiments by way of illustration, many modifications and changes will occur to those skilled in the art. It is therefore, to be understood that the appended claims are intended to cover all such modifications and changes as fall within the true spirit and scope of the invention.

What is claimed is:

1. A fluorescent lamp and ballast arrangement of the type having a lamp base for connection to a fixture that also accommodates a lamp base of an incandescent lamp, said lamp comprising:
   (a) a ballast circuit containing:
      (i) a first conversion circuit for converting a.c. voltage to d.c. voltage; said first conversion circuit including an electrolytic capacitor for smoothing said d.c. voltage; and
      (ii) a second conversion circuit for converting said d.c. voltage into a.c. current; said second conversion circuit including a resonant inductor and resonant capacitor;
   (b) a ballast housing having first and second ends spaced along a longitudinal axis of said housing and being for enclosing parts of said ballast circuit; and
   (c) only two lamp tube terminations of said lamp extending into said first end of said ballast housing, with a substantial portion of said resonant inductor being positioned directly between said two lamp tube terminations;
   (d) a printed-circuit board positioned within said ballast housing, between said electrolytic capacitor and said resonant inductor, with a first major surface facing toward said electrolytic capacitor and a second major surface facing toward said resonant inductor; said printed-circuit board being dimensioned to convectively shield said capacitor from said inductor and said lamp tube portions;
   (e) said lamp base being mounted in fixed relation to said second end of said ballast housing; and
   (f) said electrolytic capacitor being positioned at least partially within said lamp base.

2. A fluorescent lamp and ballast arrangement of the type having a lamp base for connection to a fixture that also accommodates a lamp base of an incandescent lamp, said lamp comprising:
   (a) a ballast circuit containing:
      (i) a first conversion circuit for converting a.c. voltage to d.c. voltage; said first conversion circuit including an electrolytic capacitor for smoothing said d.c. voltage; and
      (ii) a second conversion circuit for converting said d.c. voltage into a.c. current; said second conversion circuit including a resonant inductor and resonant capacitor;
   (b) a ballast housing having first and second ends spaced along a longitudinal axis of said housing and being for enclosing parts of said ballast circuit; and
   (c) only two lamp tube terminations of said lamp extending into said first end of said ballast housing at a non-zero angle to said longitudinal axis of said housing, and each termination extending away from said first end of said ballast housing and joining a respective helically shaped lamp tube portion;
   (d) a substantial portion of said resonant inductor being positioned directly between said two lamp tube terminations;
   (e) a printed-circuit board positioned within said ballast housing, between said electrolytic capacitor and said resonant inductor, with a first major surface facing toward said electrolytic capacitor and a second major surface facing toward said resonant inductor; said printed-circuit board being dimensioned to convectively shield said capacitor from said inductor and lamp tube portions;
   (f) said lamp base being mounted in fixed relation to said second end of said ballast housing; and
   (g) said electrolytic capacitor being positioned at least partially within said lamp base.

3. A fluorescent lamp and ballast arrangement of the type having a lamp base for connection to a fixture that also accommodates a lamp base of an incandescent lamp, said lamp comprising:
   (a) a ballast circuit containing:
      (i) a first conversion circuit for converting a.c. voltage to d.c. voltage; said first conversion circuit including an electrolytic capacitor for smoothing said d.c. voltage; and
      (ii) a second conversion circuit for converting said d.c. voltage into a.c. current; said second conversion circuit including a resonant inductor and resonant capacitor;
   (b) a ballast housing having first and second ends spaced along a longitudinal axis of said housing and being for enclosing parts of said ballast circuit; and
   (c) only two lamp tube terminations of said lamp extending into said first end of said ballast housing at a non-zero angle to said longitudinal axis of said housing, and each termination extending away from said first end of said ballast housing and joining a respective helically shaped lamp tube portion;
   (d) a substantial portion of said resonant inductor being positioned directly between said two lamp tube terminations;
   (e) a printed-circuit board positioned within said ballast housing, between said electrolytic capacitor and said resonant inductor, with a first major surface facing toward said electrolytic capacitor and a second major surface facing toward said resonant inductor; said printed-circuit board being dimensioned to convectively shield said capacitor from said inductor and lamp tube portions;
   (f) said lamp base being mounted in fixed relation to said second end of said ballast housing;
   (g) said electrolytic capacitor being positioned at least partially within said lamp base; and
   (h) said resonant inductor extending away from said lamp base and into each helically shaped lamp tube portion no further than one-half turn of said lamp tube portion about said longitudinal axis.

4. A lamp and ballast arrangement as recited in claim 3, wherein substantially all remaining ballast components are convectively shielded from said resonant inductor and said lamp tube portions by said printed-circuit board.

5. A lamp and ballast arrangement as recited in claim 1, further comprising a second printed-circuit board in said ballast housing, placed in parallel with said first printed-circuit board between said electrolytic capacitor and said resonant inductor; said second printed-circuit board being dimensioned to additionally convectively shield said capacitor from said inductor and said lamp tube portions, with said electrolytic capacitor being connected to the first-mentioned printed-circuit board and said resonant inductor being connected to the second printed-circuit board.

6. A lamp and ballast arrangement as recited in claim 3, wherein:
   (a) one of said lamp tube terminations contains an amalgam; and (b) said resonant inductor serves to heat the foregoing amalgam-containing lamp tube termination.

7. A lamp and ballast arrangement as recited in claim 5, wherein substantially all ballast components in addition to said resonant inductor and said electrolytic capacitor are sandwiched between said pair of printed-circuit boards.

8. A lamp and ballast arrangement as recited in claim 3, wherein substantially all remaining ballast components are convectively shielded from said resonant inductor by said printed-circuit board.

9. A lamp and ballast arrangement as recited in claim 3, further comprising a second printed-circuit board in said ballast housing, placed in parallel with said first printed-circuit board between said electrolytic capacitor and said resonant inductor; said second printed-circuit board being dimensioned to additionally convectively shield said capacitor from said inductor and said lamp tube portions, with said electrolytic capacitor being connected to the first-mentioned printed-circuit board and said resonant inductor being connected to the second printed-circuit board.

10. A lamp and ballast arrangement as recited in claim 9, wherein substantially all ballast components in addition to said resonant inductor and said electrolytic capacitor are sandwiched between said pair of printed-circuit boards.

11. A lamp and ballast arrangement as recited in claim 3, wherein said arrangement has a power rating in excess of about 20 watts.

12. A lamp and ballast arrangement as recited in claim 2, wherein substantially all remaining ballast components are convectively shielded from said resonant inductor by said printed-circuit board.

13. A lamp and ballast arrangement as recited in claim 2, further comprising a second printed-circuit board in said ballast housing, placed in parallel with said first printed-circuit board between said electrolytic capacitor and said resonant inductor; said second printed-circuit board being dimensioned to additionally convectively shield said capacitor from said inductor and said lamp tube portions, with said electrolytic capacitor being connected to the first-mentioned printed-circuit board and said resonant inductor being connected to the second printed-circuit board.

14. A lamp and ballast arrangement as recited in claim 13, wherein substantially all ballast components in addition to said resonant inductor and said electrolytic capacitor are sandwiched between said pair of printed-circuit boards.

15. A lamp and ballast arrangement as recited in claim 1, wherein:

(a) one of said lamp tube terminations contains an amalgam: and (b) said resonant inductor serves to heat the foregoing amalgam-containing lamp tube termination.

16. A lamp and ballast arrangement as recited in claim 2, wherein:

(a) one of said lamp tube terminations contains an amalgam; and (b) said resonant inductor serves to heat the foregoing amalgam-containing lamp tube termination.

17. A lamp and ballast arrangement as recited in 2, wherein said arrangement has a power rating in excess of 20 watts.

18. A lamp and ballast arrangement as recited in 1, wherein said arrangement has a power rating in excess of about 20 watts.

* * * * *